(12) United States Patent
Herwig

(10) Patent No.: US 10,445,714 B2
(45) Date of Patent: Oct. 15, 2019

(54) GESTURE-BASED SIGNATURE CAPTURE

(71) Applicant: NCR Corporation, Duluth, GA (US)

(72) Inventor: Nathaniel Christopher Herwig, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 10 days.

(21) Appl. No.: 14/608,591

(22) Filed: Jan. 29, 2015

(65) Prior Publication Data

US 2016/0224962 A1    Aug. 4, 2016

(51) Int. Cl.
| | |
|---|---|
| *G06Q 20/20* | (2012.01) |
| *G06F 3/01* | (2006.01) |
| *G06F 3/03* | (2006.01) |
| *G06F 3/00* | (2006.01) |
| *G06F 21/36* | (2013.01) |
| *G06F 21/31* | (2013.01) |
| *G06K 9/00* | (2006.01) |
| *G06Q 20/40* | (2012.01) |
| *G06F 3/0488* | (2013.01) |

(52) U.S. Cl.
CPC .......... *G06Q 20/206* (2013.01); *G06F 3/005* (2013.01); *G06F 3/017* (2013.01); *G06F 3/0304* (2013.01); *G06F 21/316* (2013.01); *G06F 21/36* (2013.01); *G06F 3/04883* (2013.01); *G06F 21/31* (2013.01); *G06K 9/00167* (2013.01); *G06K 9/00335* (2013.01); *G06K 9/00355* (2013.01); *G06Q 20/20* (2013.01); *G06Q 20/4014* (2013.01); *G06Q 20/40145* (2013.01)

(58) Field of Classification Search
CPC ..... G06F 3/017; G06F 21/31; G06K 9/00355; G06K 2009/00395; G06K 9/00335; G06K 9/00375; G06K 9/00382; G06Q 20/40145
See application file for complete search history.

(56) References Cited

U.S. PATENT DOCUMENTS

| | | | |
|---|---|---|---|
| 6,421,453 B1* | 7/2002 | Kanevsky | G06F 21/316 340/5.2 |
| 9,122,851 B2* | 9/2015 | Wyn-Harris | H04L 63/0861 |
| 2003/0132974 A1* | 7/2003 | Bodin | G06F 3/017 715/863 |
| 2003/0163708 A1* | 8/2003 | Tang | G06Q 20/341 713/185 |
| 2004/0017934 A1* | 1/2004 | Kocher | G06K 9/00382 382/125 |
| 2006/0023919 A1* | 2/2006 | Okamura | G06K 9/00362 382/115 |
| 2008/0170776 A1* | 7/2008 | Albertson | G06F 21/35 382/154 |
| 2008/0273764 A1* | 11/2008 | Scholl | G07C 9/00158 382/118 |

(Continued)

*Primary Examiner* — Christopher Stanford
(74) *Attorney, Agent, or Firm* — Schwegman, Lundberg & Woessner

(57) ABSTRACT

A customer engages in a transaction at a Point-Of-Sale (POS) terminal, which necessitates obtaining a signature from the customer to complete the transaction. A device integrated or interfaced to the POS terminal electronically captures one or more gestures made by the customer in the air representing a signature of the customer. The device processes one or more images or video representing the gestures into the signature and records the signature to complete the transaction.

19 Claims, 4 Drawing Sheets

(56) References Cited

U.S. PATENT DOCUMENTS

| | | | |
|---|---|---|---|
| 2009/0123041 A1* | 5/2009 | Tani | G06K 9/00919 |
| | | | 382/126 |
| 2009/0262069 A1* | 10/2009 | Huntington | G06F 21/34 |
| | | | 345/156 |
| 2011/0107216 A1* | 5/2011 | Bi | G06F 3/011 |
| | | | 715/716 |
| 2011/0150304 A1* | 6/2011 | Abe | A61B 5/1172 |
| | | | 382/124 |
| 2011/0282785 A1* | 11/2011 | Chin | G06F 3/04883 |
| | | | 705/42 |
| 2012/0081282 A1* | 4/2012 | Chin | G06F 3/011 |
| | | | 345/156 |
| 2012/0224040 A1* | 9/2012 | Wang | G06K 7/10881 |
| | | | 348/77 |
| 2012/0314076 A1* | 12/2012 | Da Silva | G07F 19/207 |
| | | | 348/156 |
| 2012/0325913 A1* | 12/2012 | Collins, Jr. | G06K 7/10 |
| | | | 235/462.07 |
| 2013/0004016 A1* | 1/2013 | Karakotsios | G06K 9/00355 |
| | | | 382/103 |
| 2013/0048732 A1* | 2/2013 | Gregerson | G07G 1/0018 |
| | | | 235/462.14 |
| 2013/0066749 A1* | 3/2013 | Cooke | G06F 3/017 |
| | | | 705/27.2 |
| 2013/0148024 A1* | 6/2013 | Shin | G06Q 20/40 |
| | | | 348/552 |
| 2013/0288647 A1* | 10/2013 | Turgeman | H04W 12/06 |
| | | | 455/411 |
| 2014/0098284 A1* | 4/2014 | Oberpriller | G06K 7/1095 |
| | | | 348/349 |
| 2014/0118270 A1* | 5/2014 | Moses | G06F 3/041 |
| | | | 345/173 |
| 2014/0281946 A1* | 9/2014 | Avni | G06T 1/0021 |
| | | | 715/268 |
| 2014/0310764 A1* | 10/2014 | Tippett | G06F 21/31 |
| | | | 726/1 |
| 2014/0331189 A1* | 11/2014 | Lee | G06F 3/04883 |
| | | | 715/863 |
| 2015/0054748 A1* | 2/2015 | Mason | G06F 3/017 |
| | | | 345/168 |
| 2015/0067823 A1* | 3/2015 | Chatterton | G06F 21/32 |
| | | | 726/19 |
| 2015/0084859 A1* | 3/2015 | Itzhaik | G06K 9/00355 |
| | | | 345/156 |
| 2015/0177842 A1* | 6/2015 | Rudenko | G06F 3/017 |
| | | | 345/156 |
| 2015/0192999 A1* | 7/2015 | Chirakan | G06F 3/017 |
| | | | 705/26.81 |
| 2015/0193115 A1* | 7/2015 | Chirakan | G06F 3/0488 |
| | | | 715/810 |
| 2015/0227938 A1* | 8/2015 | Smets | G06F 21/30 |
| | | | 705/21 |
| 2016/0078290 A1* | 3/2016 | Rambler | G07G 1/00 |
| | | | 382/103 |
| 2016/0162676 A1* | 6/2016 | Myers | G06F 21/35 |
| | | | 726/9 |

* cited by examiner

GESTURE-BASED SIGNATURE CAPTURE

BACKGROUND

Accepting customer signatures for credit card transactions places fairly significant cost and functional burdens on a business. When a retailer uses paper receipts the retailer typically: prints multiple receipts (one for the customer, one for the retailer, etc.), requests that the customer sign at least one copy, and stores/archives their original signed receipt (often maintaining a huge volume of original signed receipts).

If the retailer is deploying an electronic signature capturing technology, then the retailer must have an expensive specific type of transaction terminal (an Electronic Payment Terminal (e.g. VERIFONE®, etc.) or have an expensive digitizer device (e.g. TOPAZ®, etc.) somewhere in the retailer's system. In some retail environments, such as quick service environments, having a separate signature-capture device on the counter doesn't make sense because it would occupy counter space, which is already a limited and valued commodity. Moreover, the addition of a separate signature-capture device adds expense to any Point-Of-Sale (POS) solution deployed by a retailer.

Still further, even though laws have been relaxed in terms of when a signature is required by a retailer for a credit card purchase (based on the value of the purchase), retailers still must have manual or automated mechanisms in place to account for any purchase that does require signature record keeping. Thus, the retailer cannot avoid signature processing and the concomitant expenses and burdens associated therewith.

Accordingly, there is a need for a lower-cost and more efficient mechanism for signature processing.

SUMMARY

In various embodiments, methods and a Point-Of-Sale (POS) system for gesture-based signature capture are presented.

According to an embodiment, a method for gesture-based signature processing is presented. Specifically, a gesture is captured. The gesture is made without touching the capture device. The gesture is then translated into a signature, and the signature is recorded.

DETAILED DESCRIPTION

Figure 1:
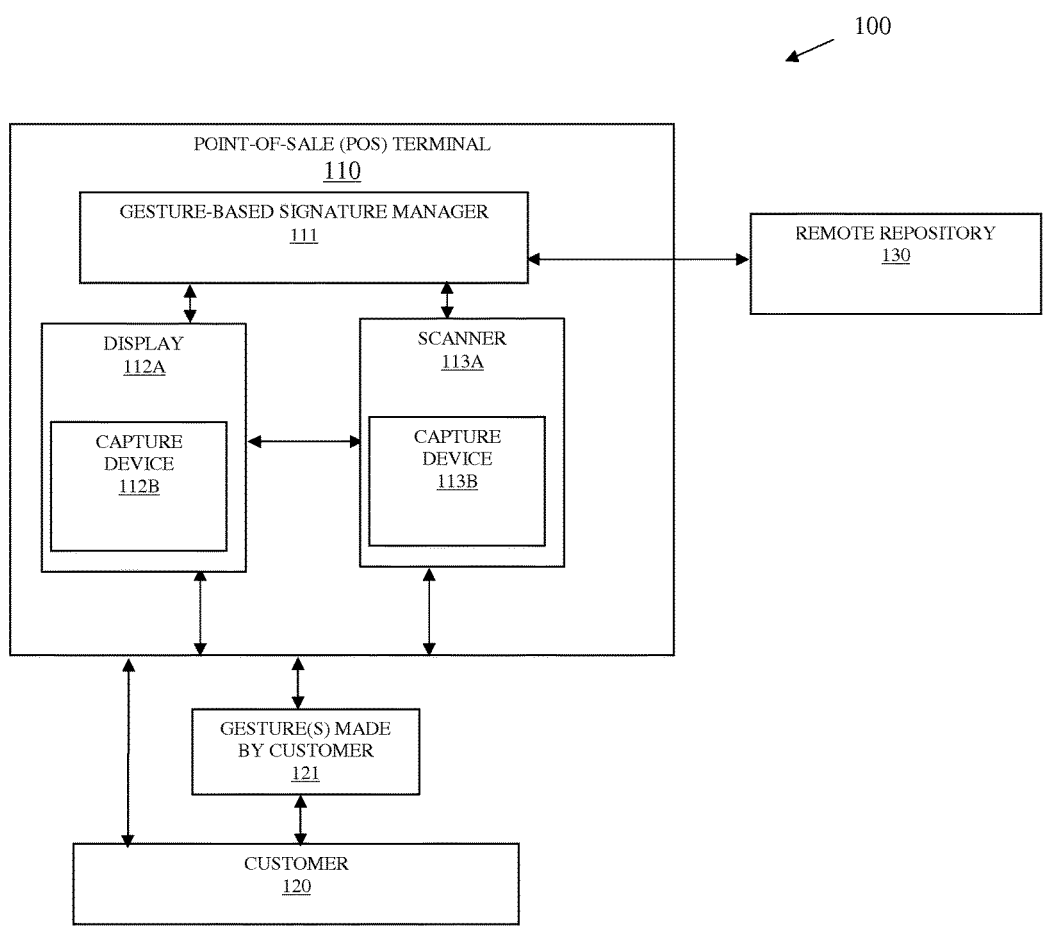
FIG. 1 is a diagram of a gesture-based signature system providing gesture-based signature processing in a retail environment, according to an example embodiment.

FIG. 1 is a diagram of a gesture-based signature system 100 providing gesture-based signature processing in a retail environment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of gesture-based signature capture, presented herein and below.

The gesture-based signature system 100 includes a gesture-based signature manager 111, a display 112A, a scanner 113A, and, optionally, a remote repository 130. The gesture-based signature system 100 also includes a capture device 112B and/or 113B, which can be integrated and/or interfaced to a portion of the display 112A (such as a bezel) or a portion of a scanner 113A (such as a bezel).

During operation of the gesture-based signature system 100, a customer 120 interacts directly with or indirectly with the POS terminal 110.

In an embodiment, the POS terminal 110 is a Self-Service Terminal (SST) and interaction between the POS terminal 110 and the customer 120 is direct with the customer 120 operating different Human Input Devices (HIDs) to conduct the transaction.

In an embodiment, the SST is a kiosk.

In an embodiment, the SST is an Automated Teller Machine (ATM).

In an embodiment, the POS terminal 110 is a cashier-assisted terminal and interaction between the POS terminal 110 and the customer is indirect with a cashier operating different HIDs to conduct the transaction on behalf of the customer.

At some point during the transaction at the POS terminal 110, the transaction may require or necessitate the collection of a signature from the customer 120. For example, the customer 120 may be using a credit card, gift card (requiring signature), or other form of payment requiring a signature. The transaction driving software (not shown in the FIG. 1) executing on the POS terminal 110 detects the customer-requirement for providing a transaction signature and informs the gesture-based signature manager 111. Alternatively, payment-based software executing on the POS terminal 110 raises an event on the POS terminal 110, and the event is detected by the gesture-based signature manager 111.

The gesture-based signature manager 111 activates either capture device 112B or 113B (depending upon where the device is integrated (either the display 112A or the scanner 113A)), or depending on whether the POS terminal 110 is a SST versus a cashier-assisted terminal. This triggers the capture device 112B or 113B to scan a field of view for which a lens or the capture device 112B or 113B is directed and collect images or video within that field of view.

Additionally, the gesture-based signature manager 111 communicates with the operator of the POS terminal 110 for the transaction (customer in a direct interaction or a cashier in an indirect interaction). The communication occurs via an output device of the POS terminal 110, such as: speakers (via audible information communicated) and/or the display 112A (note there can be, in some configurations, multiple displays—via rendered screens having presented information provided by the gesture-based signature manager 111).

In an embodiment, the information (audible, video, images, text, etc.) communicated instructs the customer 120 to place the customer's hand or writing finger and/or thumb in the field of view of the capture device 112B or 113B and make a signature gesture 121 in the air and without touching the capture device 112B or 113B. While the gesture 121 is made, the video or series of images are captured by the capture device 112B or 113B.

The gesture-based signature manager 111 collects or obtains the video or series of images. Next, the hand or finger and/or thumb portions of the video or series of images are isolated through finger/thumb and/or hand recognition processing. A variety of such, body-part motion recognition software can be used for the processing, such as what is available with MICROSOFT® Kinnect® controllers, LEAP® controllers, and the like.

In an embodiment, the gesture-based signature manager 111 provides the video or the series of images to a gesture-based body-part recognition software, such as the ones discussed above for purposes of obtaining as output isolation of the movement of the customer's hand and/or finger/thumb.

Once the gesture-based signature manager 111 has isolated frames of the video or a subset of the images with just the movement or motion of the hand or finger/thumb, the movement is converted into a series of graphical line segments reflecting the motion of the gesture 121 made by the customer 120 in air. The graphical line segments representing a signature image for a signature of the customer 120.

In an embodiment, the gesture-based signature manager 111 further converts the signature image into a size and format that is compatible with electronic signature capture devices (which require a physical touching of components of such devices by a customer or by a stylus operated by that customer).

The gesture-based signature manager 111 then provides the signature image back to the transaction-based driving software and/or the payment-based software as customer signature for the transaction occurring at the POS terminal 110.

It is noted also that the signature image may be captured in reverse depending upon the optics deployed with the POS terminal 110 or the system 100. In such a case, the signature image is inverted to provide a properly oriented signature image for further processing as noted herein.

In an embodiment, the gesture-based signature manager 111 stores the signature image in a remote repository 130 based on an identifier associated with the customer 120.

In an embodiment, the gesture-based signature manager 111 takes a sampling of features (attributes) extracted from the signature image. For example, pitch of the motion captured in the signature image, relative sizes and distances between designated portions of the signature image, particular, and others. The various attributes (features) can then be weighted and/or scored. For example, providing more weight to pitch of the signature image; rather than sizes and distances between the designated portions. The weighted attributes can then be scored to obtain a weighted score for the signature image. The process of feature (attribute) extraction, weighting, and/or scoring can then be used in a variety of manners. For example, when a customer 120 provides a later gesture-based signature the gesture-based signature manager 111 repeats the process discussed above to obtain a new score for the new signature image. The new signature image score can then be compared against the signature score for the original signature and when the difference between the original signature score and the new signature score does not fall within a predefined range, the new signature can be invalidated by the gesture-based signature manager 111 for the transaction and the customer 120 may be provided a few additional opportunities to provide a valid gesture-based signature. In still another case, the original signature score can be used to compare against a score associated with a previous electronically captured signature score of the customer 120 (one in which a conventional electronic signature capture device was used for the customer 120). Signature verification of the gesture-based signature score can occur using the score of the electronically captured signature score; again, based on a predefined threshold range (which can be different from the range used when verifying two gesture-based signature scores). In addition to the signature verification a confidence level associated with the signature verification can be used to assign a confidence score associated with the quality of the gesture-based signature image capture, such that if the confidence score is not within a predefined range and indication can be raised that signature verification cannot be achieved using the captured gesture-based signature image.

In an embodiment, the attributes/features and/or the signature image are stored in a customer profile for the customer for later comparison and recall.

Moreover, the signature image can be retained for compliance purposes.

The signature image can be used to complete the transaction at the POS terminal.

As is apparent, the system 100 provides a mechanism by which retailers can deploy a low cost and functionally efficient technique for signature capturing and processing of transactions at POS terminals. This is based on a gesture-based (air-based) signature of the consumer while conducting a transaction at the POS terminal 110.

Some of embodiments of the FIG. 1 and other embodiments are now discussed with reference to the FIGS. 2-4.

Figure 2:
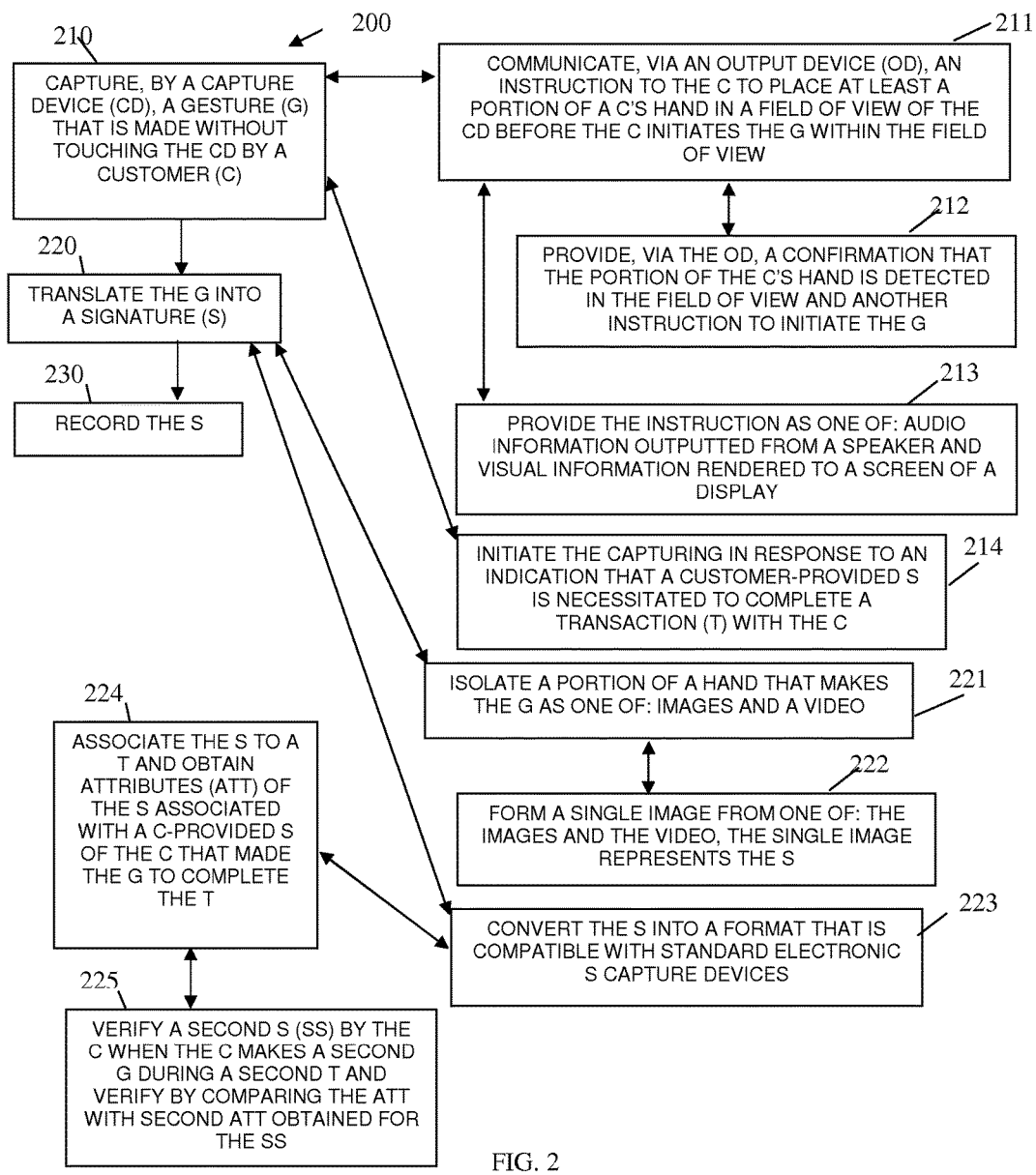
FIG. 2 is a diagram of a method for gesture-based signature processing, according to an example embodiment.

FIG. 2 is a diagram of a method 200 for gesture-based signature processing, according to an example embodiment. The software module(s) that implements the method 200 is referred to as a "gesture-based signature capture manager." The gesture-based signature capture manager is implemented as executable instructions programmed and residing within memory and/or a non-transitory computer-readable (processor-readable) storage medium and executed by one or more processors of a device. The processor(s) of the device that executes the gesture-based signature capture manager are specifically configured and programmed to process the gesture-based signature capture manager. The gesture-based signature capture manager has access to one or more network connections during its processing. The network connections can be wired, wireless, or a combination of wired and wireless.

In an embodiment, the device that executes the gesture-based signature capture manager is a POS terminal.

In an embodiment, the device that executes gesture-based signature capture manager is a Self-Service Terminal (SST).

In an embodiment, the device that executes the gesture-based signature capture manager is a kiosk.

In an embodiment, the device that executes the gesture-based signature capture manager is an Automated Teller Machine (ATM).

In an embodiment, the device that executes the gesture-based signature capture manager is a cashier-assisted terminal.

In an embodiment, the gesture-based signature capture manager is the gesture-based signature manager 111 of the FIG. 1.

At 210, the gesture-based signature capture manager captures, using a capture device, a gesture that is made without touching the capture device. The gesture is one or more series of movements or motion conducted in air by a consumer in a transaction necessitating a signature.

In an embodiment, the capture device is the capture device 112B of the FIG. 1.

In an embodiment, the capture device is the capture device 113B of the FIG. 1.

According to an embodiment, at 211, the gesture-based signature capture manager communicates, via an output device, an instruction to the customer to place at least a portion of the customer's hand (such as writing index finger) in a field of view of the capture device before the customer initiates the gesture within the field of view.

In an embodiment of 211 and at 212, the gesture-based signature capture manager provides the instruction as one or more of: audio information outputted from a speaker (where the speaker is the output device) and visual information rendered to a screen of a display (where the display is the output device).

In an embodiment, a live video feed of the customer's hand making the gesture in air is presented on a display for the customer to view in real time while making the gesture.

In an embodiment, the live video feed delineates on the display the field of view of the capture device, such that the customer knows the metes and bounds within which to make the gesture in air.

In an embodiment, at 213, the gesture-based signature capture manager initiates the capturing in response to an indication that a customer-provided signature is necessary to complete a transaction with the customer. This was discussed above with reference to the discussion of the FIG. 1.

In an embodiment, at 214, the gesture-based signature capture manager initiates the capture device as a motion detection device integrated into a POS terminal.

At 220, the gesture-based signature capture manager translates the gesture into a signature.

According to an embodiment, at 221, the gesture-based signature capture manager isolates a portion of a hand (such as a writing index finger and/or thumb) as images and/or video.

In an embodiment of 221 and at 222, the gesture-based signature capture manager forms a single image from the images and/or video. The single image represents the signature. In an embodiment, the single image is a collection of the customer's gestures, converted into a series of one or more line segments in two-dimensional space (having a height and a width). The original gesture made in the physical world by a customer in air having three dimensions (height, width, and depth).

In an embodiment, at 223, the gesture-based signature capture manager converts the signature into a format that is compatible with standard electronic signature capture devices.

In an embodiment of 223 and at 224, the gesture-based signature capture manager associates the signature to a transaction being conducted by the customer and obtains attributes/features of the signature associated with the customer-provided signature of the customer that made the gesture to complete the transaction.

In an embodiment of 224 and at 225, the gesture-based signature capture manager verifies a second and subsequent signature by the customer when the customer makes a second gesture during a second transaction. The gesture-based signature capture manager also verifies the second signature by comparing the previously stored attributes against the second attributes obtained for the second signature. This was discussed above with reference to the FIG. 1.

Figure 3:
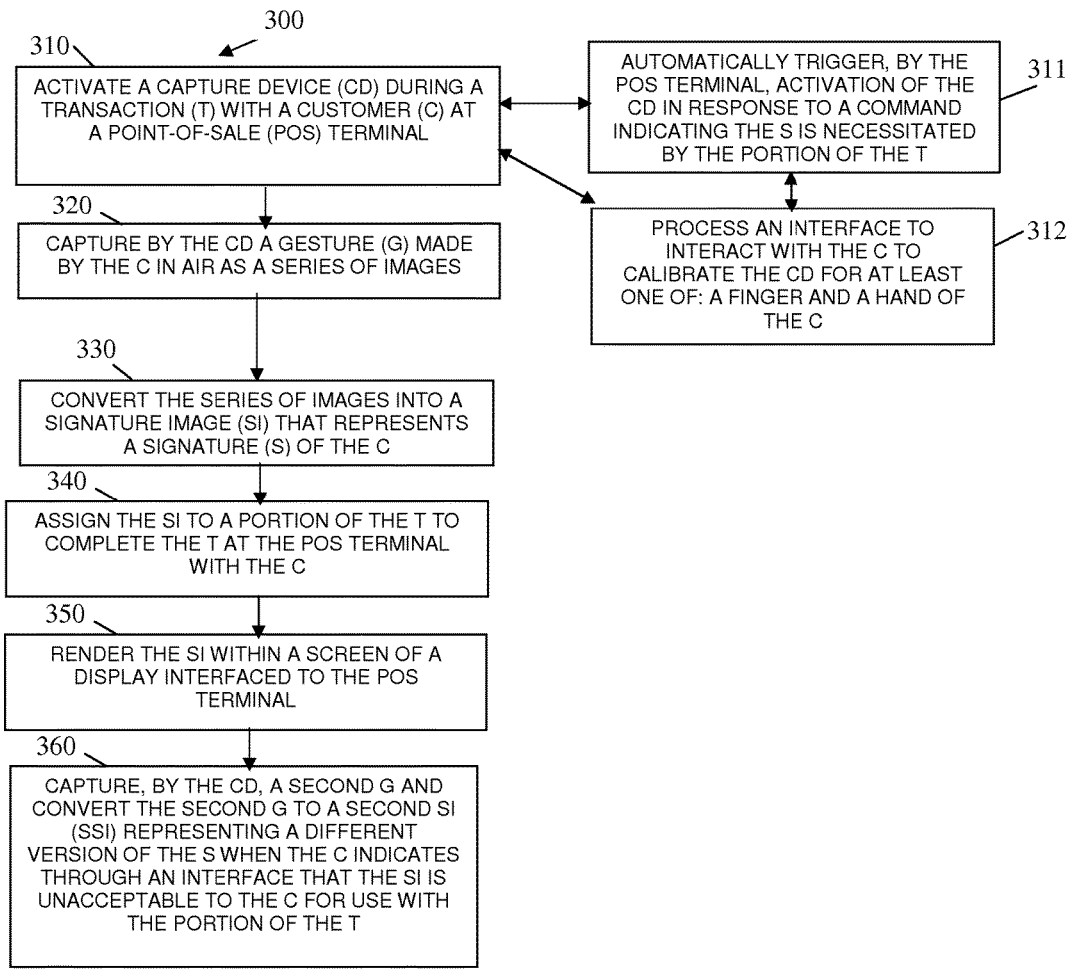
FIG. 3 is a diagram of another method for gesture-based signature processing, according to an example embodiment.

FIG. 3 is a diagram of another method for gesture-based signature processing, according to an example embodiment. The software module(s) that implements the method 300 is referred to as a "gesture-based signature capture controller." The gesture-based signature capture controller is implemented as executable instructions programmed and residing within memory and/or a non-transitory computer-readable (processor-readable) storage medium and executed by one or more processors of a device. The processors that execute the gesture-based signature capture controller are specifically configured and programmed to process the gesture-based signature capture controller. The gesture-based signature capture controller has access to one or more network connections during its processing. The network connections can be wired, wireless, or a combination of wired and wireless.

The gesture-based signature capture controller presents another and in some cases an enhanced processing perspective of the gesture-based signature capture manager represented by the method 200 of the FIG. 2.

In an embodiment, the device that executes the gesture-based signature capture controller is a POS terminal.

In an embodiment, the device that executes gesture-based signature capture controller is a Self-Service Terminal (SST).

In an embodiment, the device that executes the gesture-based signature capture controller is a kiosk.

In an embodiment, the device that executes the gesture-based signature capture controller is an Automated Teller Machine (ATM).

In an embodiment, the device that executes the gesture-based signature capture controller is a cashier-assisted terminal.

In an embodiment, the gesture-based signature capture controller is the gesture-based signature manager 111 of the FIG. 1.

In an embodiment, the gesture-based signature capture controller is the method 200 of the FIG. 2.

At 310, the gesture-based signature capture controller activates a capture device during a transaction with a customer at a POS terminal.

In an embodiment, the capture device is the capture device 112B of the FIG. 1.

In an embodiment, the capture device is the capture device 113B of the FIG. 1.

According to an embodiment, at 311, the gesture-based signature capture controller automatically triggers, by or through the POS terminal, activation of the capture device in response to a command indicating the signature is necessitated by the portion of the transaction (such as an index finger/thumb of the writing hand).

In an embodiment, at 312, the gesture-based signature capture controller processes an interface to interact with the customer to calibrate the capture device for at least one of: a finger and a hand of the customer.

At 320, the gesture-based signature capture controller captures, via the capture device, a gesture made by the customer in air and in the three-dimensional physical world. The gesture is electronically captured as a series of images.

At 330, the gesture-based signature capture controller converts the series of images into a signature image that represents a signature of the customer.

At 340, the gesture-based signature capture controller converts the series of images into a signature image that represents the signature. That is, the motion of the gesture made by the customer is converted into one or more line segments that represent the movement and motion made by the customer in air as the gesture.

At 350, the gesture-based signature capture controller assigns the signature image to a portion of the transaction (the portion requiring the customer's signature) to complete the transaction at the POS terminal with the customer or in some cases complete a payment portion of the transaction.

According to an embodiment, at 360, the gesture-based signature capture controller captures, by the capture device, a second gesture and converts the second gesture to a second image representing a different version of the signature when the customer indicates through an interface that the signature image is unacceptable to the customer for use with the portion of the transaction requiring the signature. Here, the customer wants to redo the gesture to capture the customer's signature.

Figure 4:
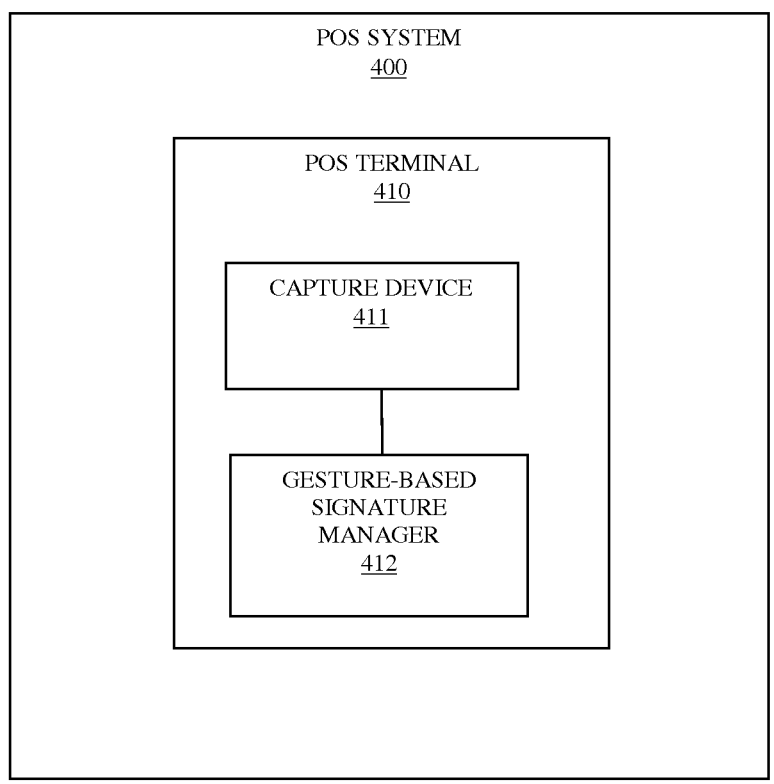
FIG. 4 is a diagram of a Point-Of-Sale (POS) system, according to an example embodiment.

FIG. 4 is a diagram of a Point-Of-Sale (POS) system 400, according to an example embodiment. The POS system 400 includes a variety of hard ware components and software components. The software components of the POS system 400 are programmed and reside within memory and/or a non-transitory computer-readable medium and execute on one or more processors of the POS system 400. The POS system 400 communicates over one or more networks, which can be wired, wireless, or a combination of wired and wireless.

In an embodiment, the POS system 400 implements, inter alia, the system 100 of the FIG. 1.

In an embodiment, the POS system 400 implements, inter alia, the method 200 of the FIG. 2.

In an embodiment, the POS system 400 implements, inter alia, the method 300 of the FIG. 3.

In an embodiment, the POS system 400 implements all and/or various combinations of the system 100, the method 200, and the method 300.

The POS system 400 includes a POS terminal 410, a capture device 411, and a gesture-based signature manager 412.

In an embodiment, the POS terminal 410 is the POS terminal 110 of the FIG. 1.

In an embodiment, the POS terminal 410 is a kiosk.

In an embodiment, the POS terminal 410 is a SST.

In an embodiment, the POS terminal 410 is a cashier-assisted terminal.

In an embodiment, the capture device 411 is the capture device 112B of the FIG. 1.

In an embodiment, the capture device 411 is the capture device 113B of the FIG. 1.

The capture device 411 is interfaced to the POS terminal 410 and the capture device 411 is configured capture a gesture made by a customer in air as a series of electronic images or video.

The gesture-based signature manager 412 is configured to: execute on the POS terminal 410, translate the electronic images or video into a single signature image for a customer during a transaction being conducted by the customer at the POS terminal 410, and record the single signature image as a customer signature for the customer to satisfy a portion of the transaction.

According to an embodiment, the capture device 411 is one of: integrated into a customer-facing bezel of a display interfaced to the POS terminal 410 (such as the backside of an operator's display for a cashier-assisted checkout terminal or front side of a customer display, such that the capture device 411 is directly facing and oriented to the customer during the transaction) and integrated into a rear-side of a scanner (such as in the back of a scanner housing where the back of the scanner housing is oriented to face the customer during the transaction) interfaced to the POS terminal 410.

In an embodiment, the capture device 411 is an imaging device (such as a webcam and others) positioned somewhere around the POS terminal 410 and oriented such that a field of view of the capture device 411 is focused in a vicinity around the customer and directed at the customer while at the POS terminal. In such an embodiment, the capture device 411 may be an independent imaging device that is affixed to some component of the POS terminal 410 (maybe via Velcro® straps) or affixed to a fixture in proximity to the POS terminal 410. Such an embodiment permits a retailer to implement the teachings presented herein for novel gesture-based signature capture without upgrading existing components of an existing POS terminal. Thus, the capture device 411 does not have to be physically integrated into housings and machinery of components associated with the POS terminal 410 (although in some embodiments it can be as discussed above) because in some cases the capture device 411 is merely interfaced to software modules processed by the POS terminal 410 and is an independent device initially configured to be oriented in a manner to capture a gesture-based signature made by the customer while conducting a transaction at the POS terminal 410.

It is also to be noted that throughout the discussion presented herein and above, the signature image of the customer captured in air through gestures of the customer is linked to (assigned to and/or associated with) a transaction record for a transaction that the customer is engaged in at a POS terminal. That is, the signature image is uniquely assigned to and recorded for the transaction to which it was supplied.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   capturing, by a capture device that is integrated into a scanner for an existing Point-Of-Sale (POS) terminal of a retailer, a gesture that is made without touching the capture device, wherein capturing further includes capturing the gesture from in-air movements made in front of but without touching the capture device;

translating the gesture into a signature and inverting the signature and converting the inverted signature into a size that is compatible with an electronic signature capture device that captures particular signatures through physical touching of components associated with the electronic signature capture device;

generating a weighted score for the inverted signature that weights a pitch of designated portions of the inverted signature and distances between the designated portions of the inverted signature; and recording the inverted signature with the weighted score.

2. The method of claim 1, wherein capturing further includes communicating, via an output device, an instruction to a customer to place at least a portion of a customer's hand in a field of view of the capture device before the customer initiates the gesture within the field of view.

3. The method of claim 2, wherein communicating further includes providing, via the output device, a confirmation that the portion of the customer's hand is detected in the field of view and another instruction to initiate the gesture.

4. The method of claim 2, wherein communicating further includes providing the instruction as the audio information outputted from a speaker and visual information rendered to a screen of a display.

5. The method of claim 1, wherein capturing further includes initiating the capturing in response to an indication that a customer-provided signature is necessitated to complete a transaction with a customer.

6. The method of claim 1, wherein capturing further includes initiating the capture device as a motion detection device integrated into the POS (POS) terminal.

7. The method of claim 1, wherein translating further includes isolating a portion of a hand that makes the gesture as one of:
images and a video.

8. The method of claim 7, wherein isolating further includes forming a single image from one of:
the images and the video, wherein the single image represents the signature.

9. The method of claim 1, wherein translating further includes converting the signature into a format that is compatible with standard electronic signature capture devices.

10. The method of claim 9, wherein converting further includes associating the signature to a transaction and obtaining attributes of the signature associated with a customer-provided signature of a customer that made the gesture to complete the transaction.

11. The method of claim 10, wherein obtaining further includes verifying a second signature by the customer when the customer makes a second gesture during a second transaction and verifying by comparing the attributes with second attributes obtained for the second signature.

12. A method, comprising:
activating a capture device integrated within a scanner for an existing Point-Of-Sale (POS) terminal of a retailer during a transaction with a customer;
capturing, by the capture device, a gesture made by the customer in air as a series of images;
converting the series of image into a signature image representing a signature of the customer, wherein converting further includes converting the signature into a size that is compatible with an electronic signature capture device that captures particular signatures through physical touching of components associated with the electronic signature capture device;
inverting the signature image as an inverted signature image;
generating a weighted score for the inverted signature image that weights a pitch of designated portions of the inverted signature image and distances between the designated portions of the inverted signature image; and
assigning the inverted signature image to a portion of the transaction to complete the transaction at the POS terminal with the customer when the weighted score is within a threshold range indicating the inverted signature image is verified for the transaction.

13. The method of claim 12, wherein activating further includes automatically triggering, by the POS terminal, activation of the capture device in response to a command indicating the signature is necessitated by the portion of the transaction.

14. The method of claim 13, wherein automatically triggering further includes processing an interface to interact with the customer to calibrate the capture device for at least one of:
a finger and a hand of the customer.

15. The method of claim 12 further comprising, rendering the inverted signature image within a screen of a display interfaced to the POS terminal.

16. The method of claim 15 further comprising, capturing, by the capture device, a second gesture and converting the second gesture to a second signature image representing a different version of the signature when the customer indicates through an interface that the signature image is unacceptable to the customer for use with the portion of the transaction.

17. The method of claim 12 further comprising, recording the inverted signature image in a profile assigned to the customer as the signature of the customer.

18. The method of claim 17, wherein recording further includes extracting selective features of the inverted signature image and recording the selective features in the profile.

19. A Point-Of-Sale (POS) system, comprising:
an existing POS terminal of a retailer;
a scanner having a capture device;
the capture device integrated into the scanner and the scanner is interfaced to the POS terminal and the capture device configured to capture a gesture of a customer made in air as a series of electronic images and without the customer making any physical touching of any component associated with the POS terminal, wherein the capture device is oriented to face the customer; and
a gesture-based signature manager configured to: i) execute on the POS terminal, ii) translate the electronic images into a single signature image for a customer during a transaction being conducted by the customer at the POS terminal and inverting the single signature image as an inverted single signature image, convert the inverted single signature into a size that is compatible with an electronic signature capture device that captures particular signatures through physical touching of particular components associated with the electronic signature capture device, and generate a weighted score for the inverted single signature image that weights a pitch of designated portions of the inverted single signature image and distances between the designated portions of the inverted signature single image, and iii) record the inverted single signature image as a customer signature for the customer to satisfy a portion of the transaction when the weighted score is within a threshold range indicating that the inverted single signature image is verified for the transaction.

* * * * *